US008736886B2

(12) United States Patent
Teraue

(10) Patent No.: US 8,736,886 B2
(45) Date of Patent: May 27, 2014

(54) PRINTING CONDITION DETERMINING APPARATUS, PRINTING CONDITION DETERMINING METHOD, AND STORAGE MEDIUM

(71) Applicant: FUJIFILM Corporation, Tokyo (JP)

(72) Inventor: Eiji Teraue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/688,301

(22) Filed: Nov. 29, 2012

(65) Prior Publication Data

US 2013/0148156 A1 Jun. 13, 2013

(30) Foreign Application Priority Data

Dec. 13, 2011 (JP) ................................. 2011-272398

(51) Int. Cl.
*G06F 3/12* (2006.01)

(52) U.S. Cl.
USPC .......... 358/1.15; 358/1.14; 358/1.13; 347/14; 347/17; 399/44; 399/91; 399/94; 399/97

(58) Field of Classification Search
CPC ... G06F 3/1204; G06F 3/1255; G06F 3/1205; G06F 3/1288; G06F 3/1257; G06F 9/4411; H04N 1/2338; H04N 1/2369; H04N 2/33369
USPC .................. 358/1.15, 1.14, 1.13; 347/14, 17; 399/44, 91, 94, 97
See application file for complete search history.

(56) References Cited

U.S. PATENT DOCUMENTS

| 7,054,022 | B2 | 5/2006 | Kazama et al. |
| 7,443,522 | B2 | 10/2008 | Nunokawa |
| 2002/0097427 | A1* | 7/2002 | Kazama et al. ............. 358/1.15 |
| 2005/0180791 | A1 | 8/2005 | Kujirai |

FOREIGN PATENT DOCUMENTS

| JP | 2002-215342 A | 8/2002 |
| JP | 2003-1876 A | 1/2003 |
| JP | 2004-206553 A | 7/2004 |
| JP | 2005-212246 A | 8/2005 |
| JP | 2007-134935 A | 5/2007 |
| JP | 2008-077374 A | 3/2008 |
| JP | 4419600 B2 | 2/2010 |

OTHER PUBLICATIONS

Extended European Search Report of Application No. 12194724.6 dated Dec. 20, 2013.

* cited by examiner

*Primary Examiner* — Jacky X Zheng
(74) *Attorney, Agent, or Firm* — Birch, Stewart, Kolasch & Birch, LLP

(57) ABSTRACT

A group of printing conditions, which have at least one condition item in common except for environmental condition items concerning a temperature and humidity environment for printing, is selected from among a plurality of printing conditions. A list image, which represents a line-up of visible information concerning the temperature and humidity environment depending on the environmental condition items, and which is included in the printing conditions of the selected group, is generated and displayed.

9 Claims, 9 Drawing Sheets

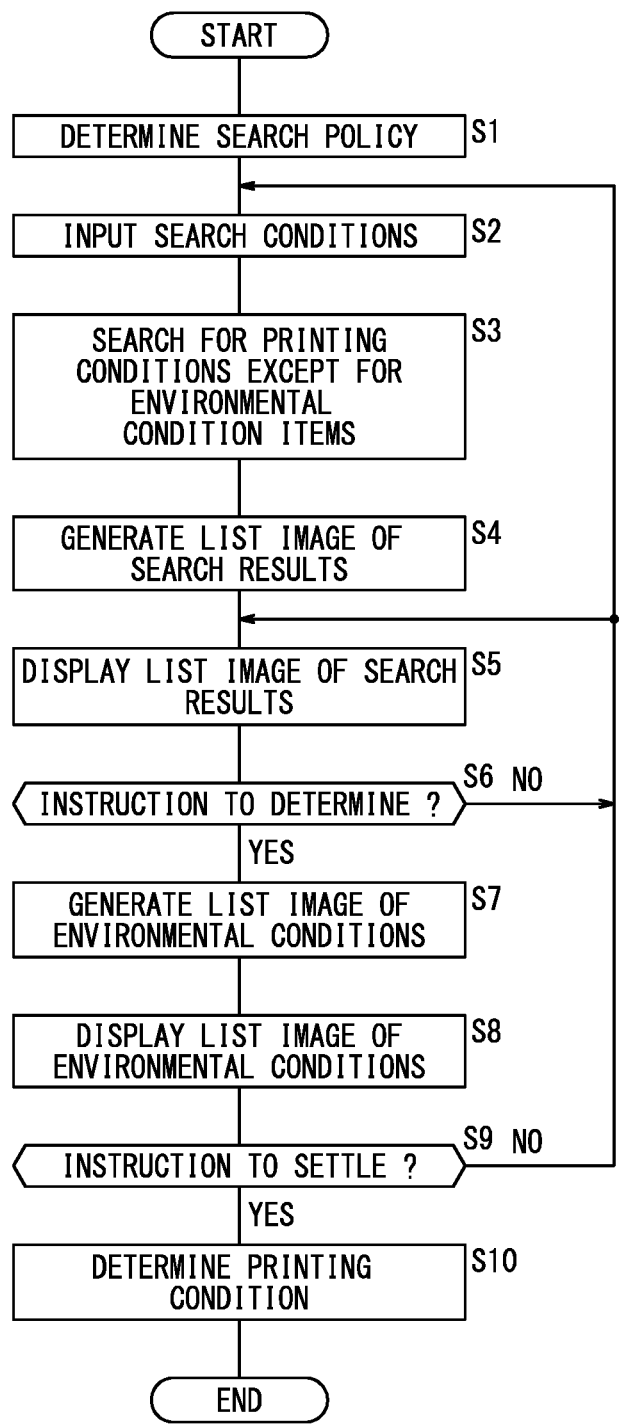

FIG. 4

| FILE NAME | PRINTING CONDITION A | PRINTING CONDITION B | PRINTING CONDITION C | PRINTING CONDITION D | PRINTING CONDITION E | PRINTING CONDITION F | ... |
|---|---|---|---|---|---|---|---|
| PRINTING PRESS NAME | PRINTING PRESS 1 | PRINTING PRESS 1 | PRINTING PRESS 1 | PRINTING PRESS 1 | PRINTING PRESS 1 | PRINTING PRESS 1 | |
| SHEET TYPE | ART PAPER | COATED PAPER | ART PAPER | ART PAPER | ART PAPER | MATTE PAPER | |
| SHEET SIZE | 939 × 636 | 939 × 636 | 939 × 636 | 939 × 636 | 939 × 636 | 939 × 636 | |
| PLATE SIZE | 1030 × 770 | 1030 × 770 | 1030 × 770 | 1030 × 770 | 1030 × 770 | 1030 × 770 | |
| COLOR PLATES | CMYK | CMYK | CMYK | CMYK+O | CMYK | CMYK | |
| BINDING PROCESS | PERFECT BINDING | PERFECT BINDING | PERFECT BINDING | PERFECT BINDING | PERFECT BINDING | — | |
| TARGET | JapanColor | JapanColor | JapanColor | AdobeRGB | JapanColor | JapanColor | |
| CUSTOMER NAME | COMPANY A | COMPANY A | COMPANY A | COMPANY A | COMPANY A | COMPANY A | |
| JOB TYPE | MAGAZINE | MAGAZINE | MAGAZINE | MAGAZINE | MAGAZINE | MAGAZINE | |
| FREQUENCY OF USE | 5 | 3 | 10 | 7 | 2 | 13 | |
| FINAL DATE OF USE | 2011/8/30 | 2011/8/3 | 2011/7/15 | 2011/6/25 | 2011/5/1 | 2011/9/7 | |
| ... | | | | | | | |

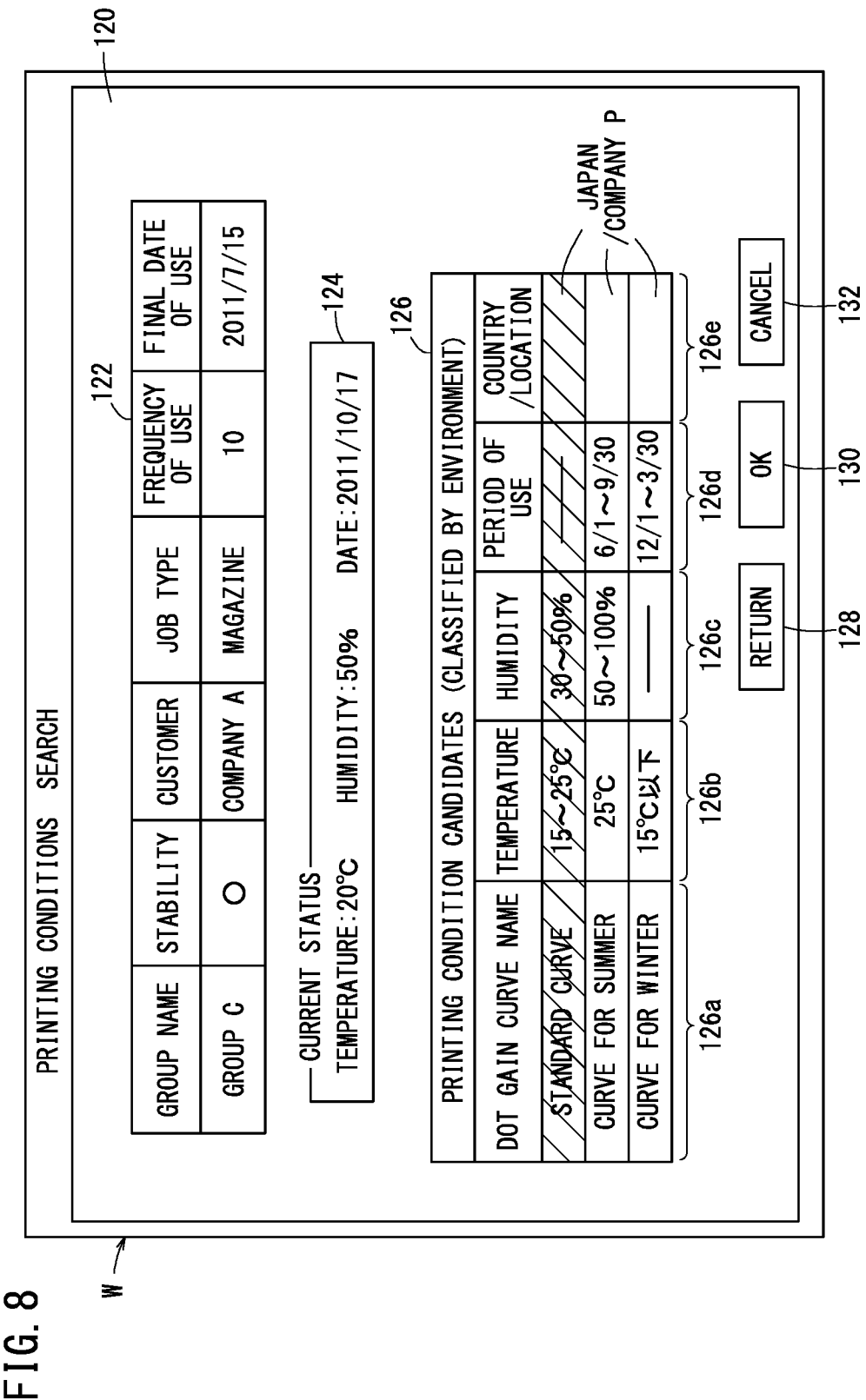

PRINTING CONDITION DETERMINING APPARATUS, PRINTING CONDITION DETERMINING METHOD, AND STORAGE MEDIUM

CROSS-REFERENCE TO RELATED APPLICATION

This application is based upon and claims the benefit of priority from Japanese Patent Application No. 2011-272398 filed on Dec. 13, 2011, the contents of which are incorporated herein by reference.

BACKGROUND OF THE INVENTION

1. Field of the Invention

The present invention relates to a printing condition determining apparatus, a printing condition determining method, and a storage medium for determining a printing condition representing a combination of two or more condition items concerning printing.

2. Description of the Related Art

Recently, CTP (Computer To Plate) technology for directly producing printing plates from electronic data without the need for generating any intermediate products has been in widespread use in the printing field. For example, if a printing company determines that an order has been newly placed by a production company, which is similar to an order that was placed in the past, it is convenient for the printing company to employ a printing condition used for the past order, and to carry out a printing job according to such a printing condition. In this case, "printing condition" refers to a composite printing condition representing a combination of two or more condition items concerning printing. There have been proposed in the art various user interfaces, which enable the user to determine a printing condition from a plurality of selectable printing conditions based on search operations made by the user.

Japanese Laid-Open Patent Publication No. 2004-206553 discloses a method and software for searching for certain condition items from a given list of condition items, and for displaying a setting screen depending on condition items that have been found. More specifically, the publication discloses the aggregation of setting sections for a plurality of selected condition items for display in one setting screen.

The condition items referred to above may include general items that can be set, e.g., a type of printing machine and a type of sheets, and also items concerning temperature and humidity environments, e.g., temperature and humidity. For example, Japanese Laid-Open Patent Publication No. 2007-134935 and Japanese Laid-Open Patent Publication No. 2005-212246 reveal apparatus and methods for preparing a plurality of different color converting conditions, e.g., a lookup table, and performing a color conversion process for images based on color converting conditions suitable for present temperature and humidity environments.

SUMMARY OF THE INVENTION

Printing conditions for CTP systems include, for example, various items for producing printing plates and many various items ancillary thereto. In particular, information used to specify temperature and humidity environments may not be represented by certain numerical values of temperature and humidity, but rather, may be represented by numerical ranges, or a season, a period, a time zone, an installation location, or the like. In other words, essentially, a large number of condition items can exist for specifying temperature and humidity environments, as well as inconsistencies, i.e., so-called fluctuations, that tend to occur in relation to search terms.

However, according to the apparatus and methods disclosed in Japanese Laid-Open Patent Publication No. 2004-206553, Japanese Laid-Open Patent Publication No. 2007-134935, and Japanese Laid-Open Patent Publication No. 2005-212246, nothing is disclosed or suggested about combining terms, which represent various multiple expressions, in order to search for and determine temperature and humidity environments. Consequently, if condition items concerning temperature and humidity environments are searched for, it is highly likely that printing conditions and printing conditions suitable for temperature and humidity environments may be missed and not determined.

It is an object of the present invention to provide a printing condition determining apparatus, a printing condition determining method, and a storage medium, which are capable of increasing the accuracy with which a suitable printing condition can be selected without fail from among a plurality of printing conditions including condition items concerning temperature and humidity environments.

A printing condition determining apparatus according to the present invention comprises a condition selector for selecting a group of printing conditions, which have at least one condition item in common except for environmental condition items concerning a temperature and humidity environment for printing, from among a plurality of printing conditions each representing a combination of two or more condition items concerning printing, and a list image generator for generating a list image, which represents a line-up of visible information concerning the temperature and humidity environment depending on the environmental condition items, and which is included in the printing conditions of the group selected by the condition selector.

Since the printing condition determining apparatus includes the condition selector for selecting, from among a plurality of printing conditions, a group of printing conditions, which have at least one condition item in common except for environmental condition items concerning temperature and humidity environments for printing, difficulty in the search process using the environmental condition items is eliminated. The printing condition determining apparatus also includes the list image generator for generating the list image, which represents a line-up of visible information concerning temperature and humidity environments depending on environmental condition items, and which is included in the printing conditions of the selected group. Therefore, by comparing the visible information represented by the list image, the operator of the printing condition determining apparatus can immediately grasp the adequacy of temperature and humidity environments depending on the environmental condition items. As a consequence, an appropriate printing condition can be determined highly accurately and without fail from among a plurality of printing conditions including condition items concerning temperature and humidity environments.

The printing condition determining apparatus preferably further comprises a search information input unit for inputting search information to carry out a search process on the plurality of printing conditions.

The condition selector preferably selects the group of printing conditions from among a predetermined number of printing condition groups, which are obtained by the search process according to the search information input by the search information input unit.

The search information input unit preferably inputs as the search information priorities concerning at least two condition items used in the search process.

The printing condition determining apparatus preferably further comprises an environmental information acquirer for acquiring information concerning the temperature and humidity environment, wherein the condition selector preferably further selects a printing condition, which is equal or close to the temperature and humidity environment acquired by the environmental information acquirer, from among the group of printing conditions.

The environmental condition items preferably include at least a dot gain curve.

The printing condition determining apparatus preferably further comprises a display unit for displaying the list image generated by the list image generator.

According to the present invention, there also is provided a printing condition determining method for enabling an apparatus to determine a printing condition representing a combination of two or more condition items concerning printing, and to carry out the steps of selecting a group of printing conditions, which have at least one condition item in common except for environmental condition items concerning a temperature and humidity environment for printing, from among a plurality of printing conditions, and generating a list image, which represents a line-up of visible information concerning the temperature and humidity environment depending on the environmental condition items, and which is included in the printing conditions of the selected group.

According to the present invention, there further is provided a storage medium, which is readable by a computer and stores therein a program for determining a printing condition representing a combination of two or more condition items concerning printing, the program enabling the computer to carry out the steps of selecting a group of printing conditions, which have at least one condition item in common except for environmental condition items concerning a temperature and humidity environment for printing, from among a plurality of printing conditions, and generating a list image, which represents a line-up of visible information concerning the temperature and humidity environment depending on the environmental condition items, and which is included in the printing conditions of the selected group.

With the printing condition determining apparatus, the printing condition determining method, and the computer-readable storage medium according to the present invention, a group of printing conditions, which have at least one condition item in common except for environmental condition items concerning temperature and humidity environments for printing, is selected from among a plurality of printing conditions, difficulty in a search process using environmental condition items is eliminated. Furthermore, the list image, which represents a line-up of visible information concerning temperature and humidity environments depending on environmental condition items, and which is included in the printing conditions of the selected group, is generated. Therefore, the operator of the printing condition determining apparatus can immediately grasp the adequacy of temperature and humidity environments that depend on the environmental condition items by comparing the visible information represented by the list image. As a consequence, an appropriate printing condition can be determined highly accurately and without fail from the plurality of printing conditions, including condition items concerning temperature and humidity environments.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart of an operation sequence of the RIP apparatus shown in FIGS. 1 and 2;

FIG. 4 is a diagram showing a list table representing a printing condition database;

FIG. 8 is a view of a third image showing an example of a search screen; and

DESCRIPTION OF THE PREFERRED EMBODIMENTS

A printing condition determining method according to a preferred embodiment of the present invention, in relation to a printing condition determining apparatus, a storage medium (program), and a print production system for carrying out the printing condition determining method, will be described in detail below with reference to the accompanying drawings.

Figure 1:
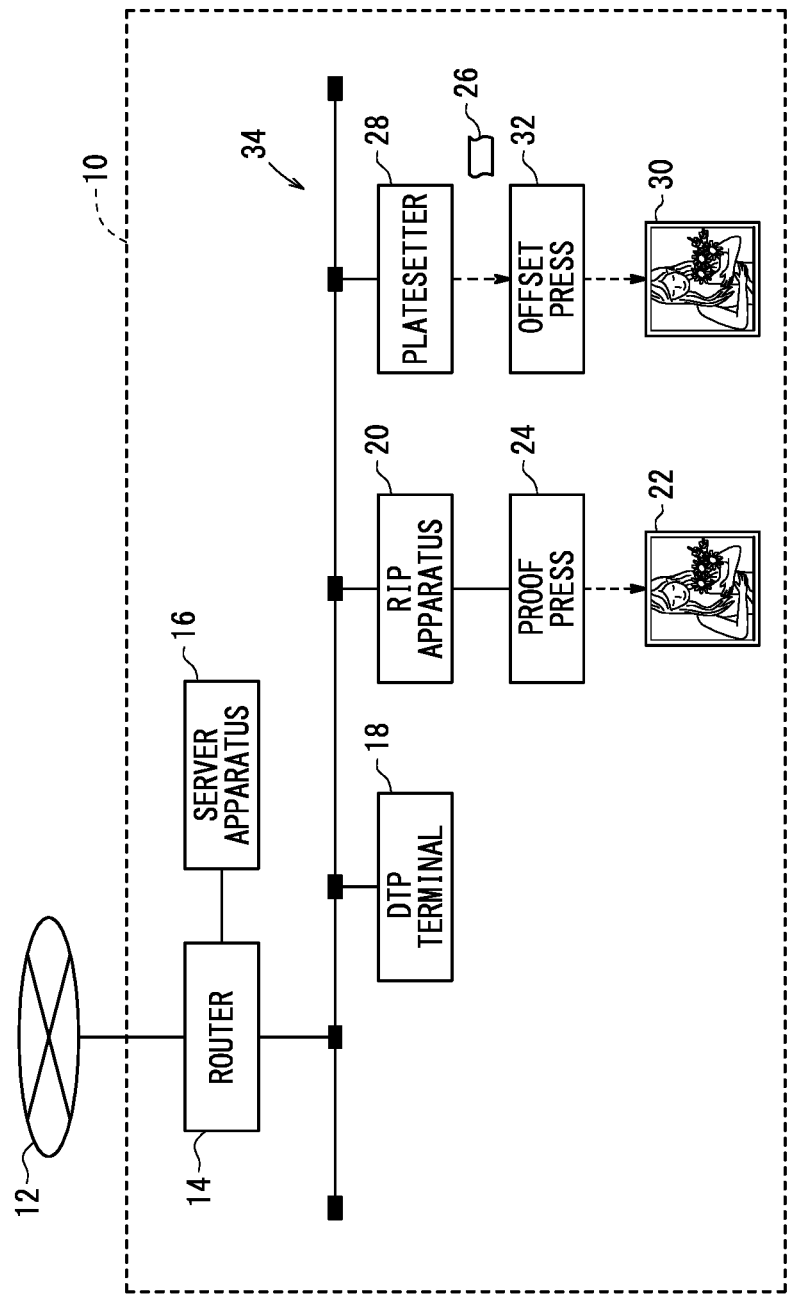
FIG. 1 is a block diagram of a print production system incorporating an RIP apparatus therein as a printing condition determining apparatus according to an embodiment of the present invention.

FIG. 1 shows in block form a print production system 10 incorporating an RIP (Raster Image Processing) apparatus 20 as a printing condition determining apparatus according to an embodiment of the present invention.

As shown in FIG. 1, the print production system 10 includes a router 14 as a device that connects the print production system 10 to a network 12, a server apparatus 16 accessible through the network 12 from each of terminal units, not shown, belonging to an external network, a DTP terminal 18 for performing DTP (Desktop Publishing) processes including a process for editing content data acquired from the server apparatus 16, the RIP apparatus 20 (printing condition determining apparatus) for performing various image processing techniques including a rasterizing process and a color converting process on proof data or platemaking data generated by the DTP terminal 18, a proof press 24 for printing a proof 22 based on processed proof data from the RIP apparatus 20, a platesetter 28 for producing printing plates 26 based on proof data from the RIP apparatus 20, and an offset press 32 for printing a print 30 with the printing plates 26 mounted thereon.

The server apparatus 16 serves as a core device to carry out work flow management in the print production system 10. The server apparatus 16 is connected to each of respective terminal units of at least one of a designer and a production company, not shown, for communication therewith. The server apparatus 16 also is connected to the DTP terminal 18, the RIP apparatus 20, and the platesetter 28 for communication therewith through a LAN (Local Area Network) 34 constructed in the print production system 10.

The server apparatus 16 functions as a file server for storing and transferring various files, and as an authority management server for managing task authorities that can be executed by terminal units, users, or print jobs. The server apparatus 16 also functions as a mail server for generating and distributing mail notices at given times such as at the beginning and ending of processes. Various data files that can be managed by the file server include, for example, files of content data, proof data, platemaking data, job tickets, for example, JDF (Job Definition Format) files, ICC (International Color Consortium) profiles, color sample data, and history information of printing conditions used in the past (hereinafter referred to as a printing condition database).

The DTP terminal 18 is a computer that generates edited data per page from content data representing characters, figures, patterns, pictures, etc., after the content data have been processed by a preflight process. The DTP terminal 18 also performs an imposing process according to a binding process and a page folding process, which have been designated, by referring to tag information of a job ticket.

The RIP apparatus 20 is a computer that functions as a print processing server for at least one printing press. In FIG. 1, the RIP apparatus 20 is connected to the proof press 24 and the platesetter 28 for communication therewith. The RIP apparatus 20 converts proofread data expressed in PDL (Page Description Language) into print data suitable for printing presses, and supplies the print data to the proof press 24 or the platesetter 28.

The proof press 24 prints a proof 22 based on the print data supplied from the RIP apparatus 20. The proof press 24 may comprise a DDCP (Direct Digital Color Proofer), an ink jet color proofer, a low-resolution color laser printer (electrophotographic printer), an ink jet printer, or the like.

The offset press 32 produces a print 30 by applying inks to a print medium through printing plates 26 and intermediate transfer members, not shown. The offset press 32 may be replaced with a digital printing press for direct printing. Such a digital printing press may comprise an ink jet color proofer, a color laser printer (electrophotographic printer), or the like.

Figure 2:
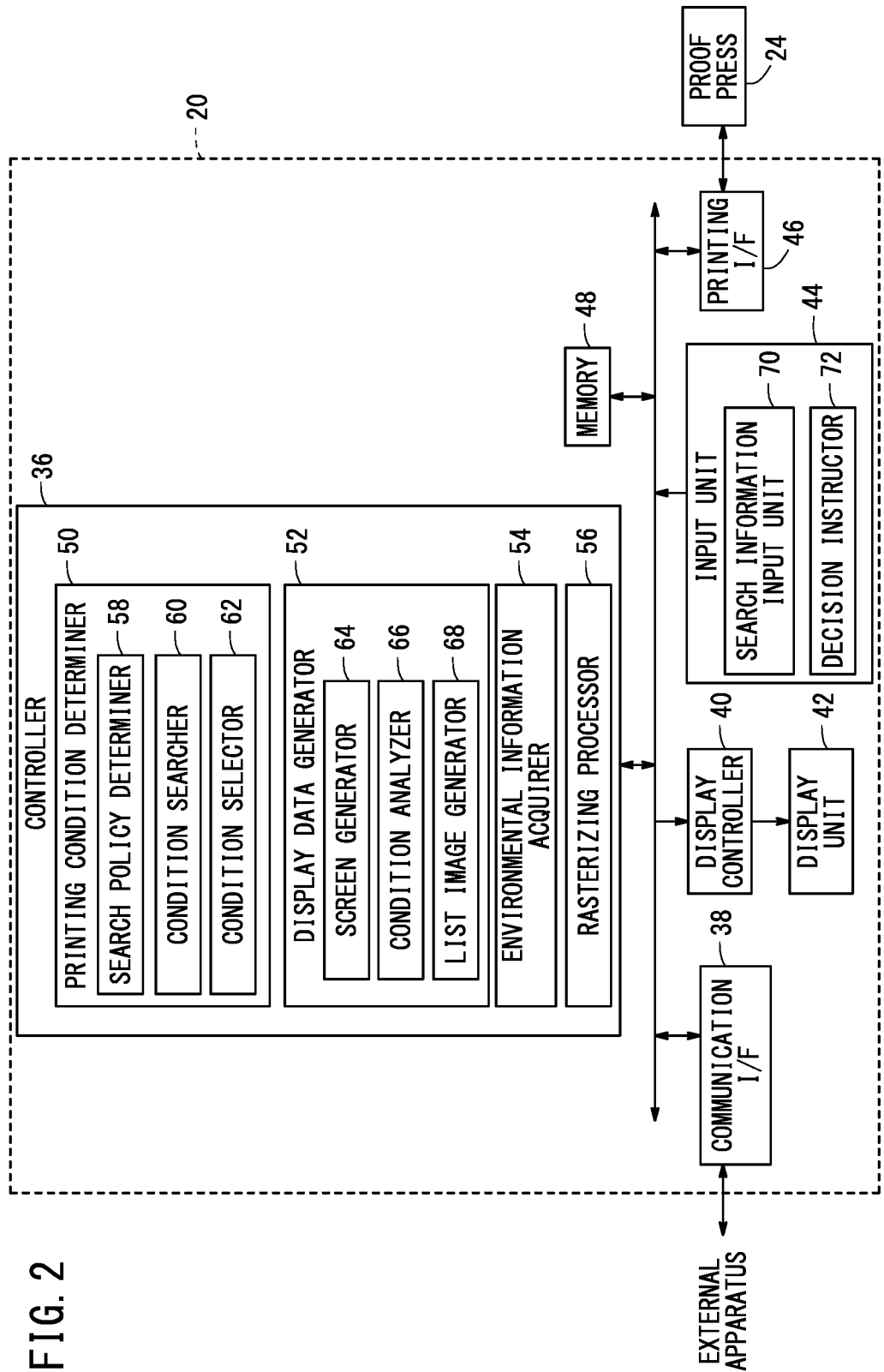
FIG. 2 is an electric block diagram of the RIP apparatus shown in FIG. 1.

FIG. 2 is an electric block diagram of the RIP apparatus 20 shown in FIG. 1.

As shown in FIG. 2, the RIP apparatus 20 includes a controller 36, a communication I/F 38, a display controller 40, a display unit 42, an input unit 44, a printing I/F 46, and a memory 48 (storage medium).

The communication I/F 38 is an interface for sending electric signals to and receiving electric signals from external apparatus. For example, the communication I/F 38 can acquire various items of information such as proof data, platemaking data, a printing condition database, ICC profiles, etc., which are managed and saved in the server apparatus 16 (see FIG. 1).

The display controller 40 comprises a control circuit for controlling the display unit 42 under the control of the controller 36. More specifically, if the display controller 40 outputs a display control signal via an I/F, not shown, to the display unit 42, the display unit 42 is energized to display various images including windows W (see FIGS. 5 through 9B).

The printing I/F 46 is an interface for sending electric signals representing printing data to the proof press 24 to enable the proof press 24 to print a desired proof 22.

The memory 48 stores programs and data, which are required for the controller 36 to control various components. The memory 48 may comprise a computer-readable storage medium such as a nonvolatile memory, a hard disk, or the like.

The controller 36 comprises a processor such as a CPU (Central Processing Unit). The controller 36 reads and executes programs stored in the memory 48 in order to perform the functions of a printing condition determiner 50, a display data generator 52, an environmental information acquirer 54, and a rasterizing processor 56.

The programs may be recorded in a computer-readable storage medium. The programs recorded in the storage medium may be read and run by a computer system. The computer system includes an operating system OS and hardware such as a CPU and peripheral devices. The computer-readable storage medium comprises a portable medium such as a flexible disk, a magneto-optical disk, a ROM, a hard disk, a CD-ROM, or the like, or a storage medium such as a hard disk or the like that is incorporated in the computer system. The storage medium may also include a medium for dynamically holding programs for a short period of time, for example, a communication line for transmitting programs via a network such as the Internet or the like or a communication channel such as a telephone line, or a memory for holding programs for a certain period of time such as a volatile memory in a computer system that serves as a server or a client in a network environment.

The printing condition determiner 50 determines one printing condition from among a plurality of printing conditions that are stored in an external apparatus, e.g., the server apparatus 16 or the memory 48. More specifically, the printing condition determiner 50 includes a search policy determiner 58 for determining a search policy for a printing condition, a condition searcher 60 for acquiring a search result representing printing conditions from a printing condition database, and a condition selector 62 for selecting a printing condition and a printing condition group, to be described in detail later, from among a plurality of printing conditions acquired by the condition searcher 60.

The display data generator 52 includes a screen generator 64 for generating a setting screen 80 (see FIG. 5) and a search screen 90 (see FIG. 6), a condition analyzer 66 for analyzing the content of later-described environmental condition items, which are included in the printing conditions, and a list image generator 68 for generating an image to display a list of search results or environmental conditions (hereinafter referred to as a "list image").

To "display a list" represents a process of displaying a line-up of visible information concerning certain condition items included in the printing conditions. Such a process is particularly effective for comparing a relatively small number of printing conditions.

The environmental information acquirer 54 acquires environmental information for printing a printing job that is to be carried out. The environmental information includes, for example, the temperature and humidity in the vicinity of the offset press 32, the time and place where a print 30 is produced, etc.

The rasterizing processor 56 performs a rasterizing process on proof data including proofread data. The rasterizing process includes a data format conversion process for converting data from a PDL format into a raster format, and a color matching process using an ICC profile.

The input unit 44 comprises various input devices including a mouse, a trackball, a keyboard, etc. The input unit 44 functions as a search information input unit 70 for inputting search information used to carry out a search process on the printing condition database, and a decision instructor 72 for instructing the controller 36 to determine a printing condition group or a printing condition suitable for a printing job.

The RIP apparatus 20, which serves as a printing condition determining apparatus according to the present embodiment, is constructed as described above. Operations of the RIP apparatus 20 will be described in detail below with reference to the flowchart shown in FIG. 3.

Prior to describing operations of the RIP apparatus 20, the printing condition database will first be described below. In the description and claims of the present application, it should be noted that the term "printing condition" implies a composite condition, which represents a combination of two or more condition items concerning printing.

FIG. 4 is a diagram showing a list table, which represents a printing condition database. It is assumed that the printing condition database stores a plurality of printing conditions each in a given file format. As shown in FIG. 4, the printing condition database stores files "PRINTING CONDITION A" through "PRINTING CONDITION F" (file extensions are omitted from illustration), each of which is associated with two or more condition items. The condition items include, under each filename, a printing press name, a sheet type, a sheet size, a plate size, color plates, a binding process, a target (target profile type), a customer name, a job type, a user frequency, and final data for use. The condition items may include not only data directly involved in a printing process, such as a printing press name, color plates, a profile, etc., but also data (so-called metadata) ancillary to such data. For an offset printing process, the condition items include, for example, a printing press, a sheet, inks, a halftone type, a resolution, a screen ruling, an angle setting, and also color conversion conditions including a dot gain curve, a printing profile, a device link profile, etc.

According to the present embodiment, the aforementioned condition items are classified into a set of condition items for printing (hereinafter referred to as "environmental condition items"), which are related to temperature and humidity environments, and a set of condition items (hereinafter referred to as "non-environmental condition items"), which are not related to temperature and humidity environments. For facilitating the search process, a group of condition items, which include in common at least one non-environmental condition item exclusive of the environmental condition items, is handled as a group of condition items. The group of condition items will hereinafter be referred to as a "condition item group".

The environmental condition items include, for example, temperature, humidity, a season, a period, a time zone, weather, an installation location (including a region such as a country or the like), etc. All of the condition items shown in FIG. 4 are non-environmental condition items. Although not shown, at least one environmental condition item, e.g., temperature, humidity, a period of use, or a dot gain curve, is associated with each of the printing conditions, e.g., the printing condition C. For an offset printing process, in particular, environmental condition items are often included in printing conditions as relatively large color variations, which occur depending on temperature and humidity environments.

In step S1 shown in FIG. 3, the search information input unit 70 inputs various items of information into the RIP apparatus 20 concerning a search policy for a printing condition, in response to actions made by the operator (user) on the input unit 44.

In response to an instruction to start a search process, the screen generator 64 generates display data for the setting screen 80, and supplies the generated display data to the display controller 40. Based on the supplied display data, the display controller 40 displays a window W including the setting screen 80 on the display unit 42.

Figure 5:
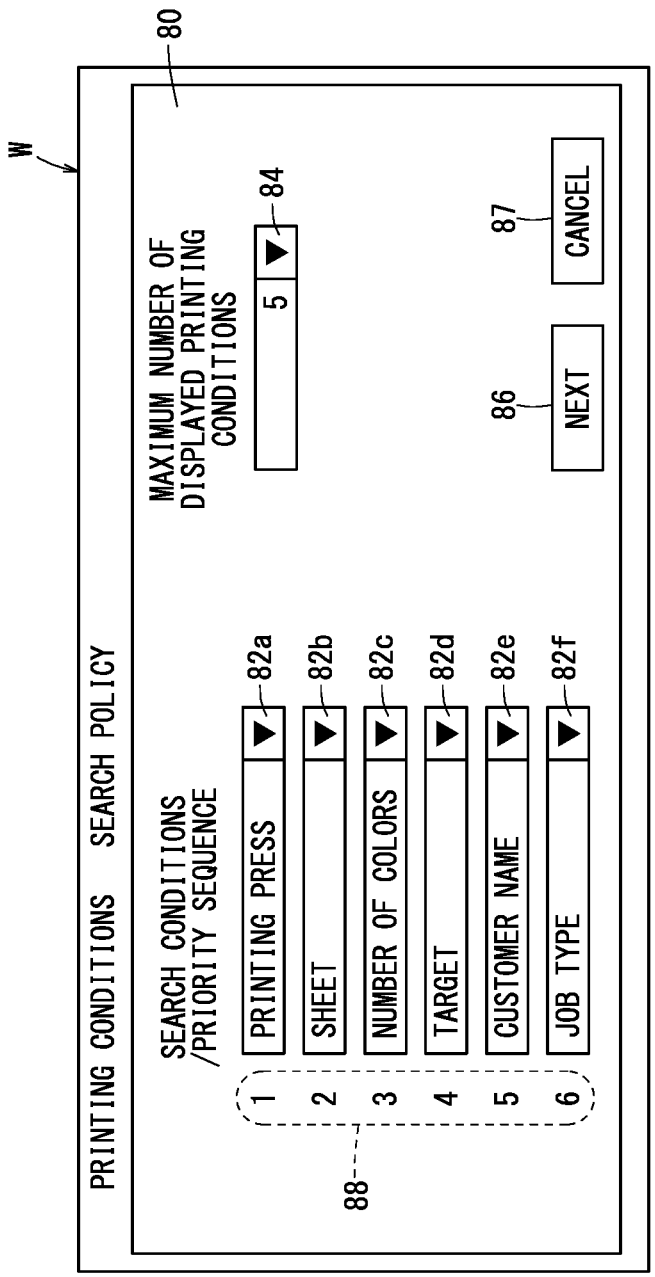
FIG. 5 is a view of an image showing an example of a setting screen.

As shown in FIG. 5, the setting screen 80 includes six combo boxes 82a through 82f, a pull-down menu 84, a button 86 labeled "NEXT", and a button 87 labeled "CANCEL", which are arranged from an upper left corner toward a lower right corner of the setting screen 80. The combo boxes 82a through 82f and the pull-down menu 84 enable the functions of the search information input unit 70 to be carried out.

Each of the combo boxes 82a through 82f can be used to designate and input one condition item to be used in the search process. Alternatively, at least two condition items may be designated, which make up a printing condition. In the present embodiment, only non-environmental condition items, but not environmental condition items, can be designated by each of the combo boxes 82a through 82f.

Numerals 88 labeled "1" through "6" are displayed on the left-hand side of the combo boxes 82a through 82f. The numerals 88 represent a priority sequence of condition items used in the search process. More specifically, smaller numerals indicate higher priorities, and greater numerals indicate lower priorities.

The pull-down menu 84 can be used to designate and input a maximum number of printing condition groups that can be displayed (hereinafter referred to as a "maximum display number") upon display of a list of search results. In FIG. 5, the maximum display number is 5.

The operator designates at least one condition item to be used in the search process, and assigns priorities to the designated condition items. It is assumed that, in response to input actions made by the operator, a printing press (a printing press name in FIG. 4), a sheet (a sheet type in FIG. 4), the number of colors (color plates in FIG. 4), a target (a target in FIG. 4), a customer name (a customer name in FIG. 4), and a job type (a job type in FIG. 4) are selected according to the named priority sequence.

If the operator clicks on the "NEXT" button 86, the search policy determiner 58 determines a search policy for a printing condition, and instructs the screen generator 64 to accept search inputs from the operator according to the search policy. If the operator clicks on the "CANCEL" button 87, the RIP apparatus 20 terminates the search process.

In step S2 shown in FIG. 3, in response to an action made by the operator on the input unit 44, the search information input unit 70 inputs into the RIP apparatus 20 search information for the printing condition database. If the operator clicks on the "NEXT" button 86, the screen generator 64 generates display data for the search screen 90, and supplies the generated display data to the display controller 40. Based on the supplied display data, the display controller 40 displays a window W including the search screen 90 on the display unit 42.

Figure 6:
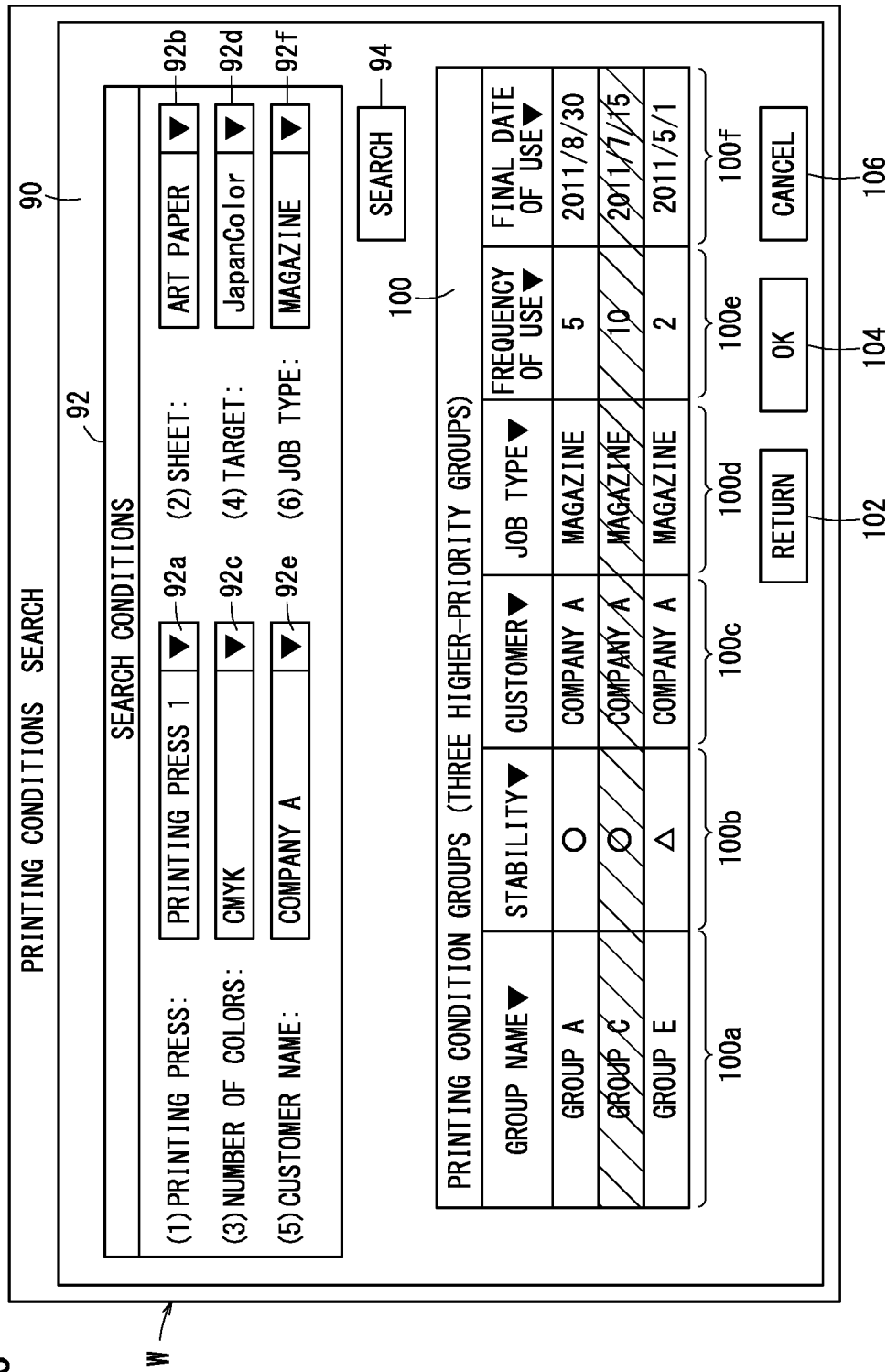
FIG. 6 is a view of a first image showing an example of a search screen.

As shown in FIG. 6, the search screen 90 includes in the upper half portion thereof an input field 92 and a button 94 labeled "SEARCH". The input field 92 performs the function of the search information input unit 70 (see FIG. 2).

The input field 92 is made up of six combo boxes 92a through 92f. Each of the combo boxes 92a through 92f can be used to designate and input a search condition concerning one condition item designated through the setting screen 80 (see FIG. 5). The operator may input a search condition directly by selecting the search condition from among a plurality of preset items, or may input the search condition in a text format by operating the keyboard.

In order to determine a printing condition suitable for a printing job to be carried out, the operator designates at least one search condition through the search screen 90. In response to actions made by the operator on the input unit 44, it is assumed that on the search screen 90, "PRINTING PRESS 1" is designated as the printing press (the printing press name in FIG. 4), "ART PAPER" is designated as the sheet (the sheet type in FIG. 4), "CMYK" is designated as the number of colors (the color plates in FIG. 4), "Japan Color" is designated as the target (the target in FIG. 4), "COMPANY A" is designated as the customer name (the customer name in FIG. 4), and "MAGAZINE" is designated as the job type (the job type in FIG. 4).

In step S3 shown in FIG. 3, the server apparatus 16 searches for printing conditions based on the search condition input in step S2. In the case where the operator clicks on the "SEARCH" button 94, the condition searcher 60 starts to perform the search process. Alternatively, the condition searcher 60 may immediately start to perform the search process after the condition searcher 60 has accepted a change in the search condition through the combo boxes 92a through 92f, without the operator having to click on the "SEARCH" button 94.

The RIP apparatus 20 sends a notice of request for the search process and the designated condition items to the server apparatus 16. The server apparatus 16 performs the search process within the range of the printing condition database, and sends information concerning obtained search results back to the RIP apparatus 20. The condition searcher 60 acquires the search results, e.g., a list of printing conditions, from the printing condition database. The search condition may be carried out by the RIP apparatus 20, i.e., the condition searcher 60, rather than by means of an external apparatus such as the server apparatus 16. It is assumed that the search process has found three printing condition groups, which are not in excess of the maximum display number (5) designated through the setting screen 80 (see FIG. 5).

In step S4 shown in FIG. 3, the list image generator 68 generates a search result list image 100. The search result list image 100 comprises an image of a line-up of information concerning printing condition groups, which have at least one non-environmental condition item (six non-environmental condition items in FIG. 6) in common.

In step S5 shown in FIG. 3, the RIP apparatus 20 displays a list of search results concerning printing conditions. More specifically, the screen generator 64 generates display data for the search screen 90, which includes the search result list image 100, and supplies the display data to the display controller 40. Based on the supplied display data, the display controller 40 displays the window W including the search screen 90 on the display unit 42.

As shown in FIG. 6, the search screen 90 includes in a lower half portion thereof the search result list image 100, a button 102 labeled "RETURN", a button 104 labeled "OK", and a button 106 labeled "CANCEL". The "OK" button 104 performs the function of the decision instructor 72 for instructing the controller 36 to determine a printing condition group from among a given number of printing condition groups obtained by the search process.

The search result list image 100 includes a small field 100a indicating the names of printing condition groups, a small field 100b indicating evaluation results concerning stability of color reproduction, a small field 100c indicating customer names, a small field 100d indicating job types, a small field 100e indicating frequencies of use, and a small field 100f indicating final dates of use.

Condition items displayed in the small fields 100a through 100f may be the same or different from condition items that actually are used. The search result list image 100 may be updated and displayed after the condition items have been sorted or switched, in response to a certain action made by the operator on the input unit 44.

In FIG. 6, the search result list image 100 displays attributes of five condition items concerning three printing condition groups, i.e., groups A, C, E. A number of printing condition groups, which are extracted from a plurality of printing conditions and which ultimately can be determined, will hereinafter be referred to as "group candidates".

Figure 7:
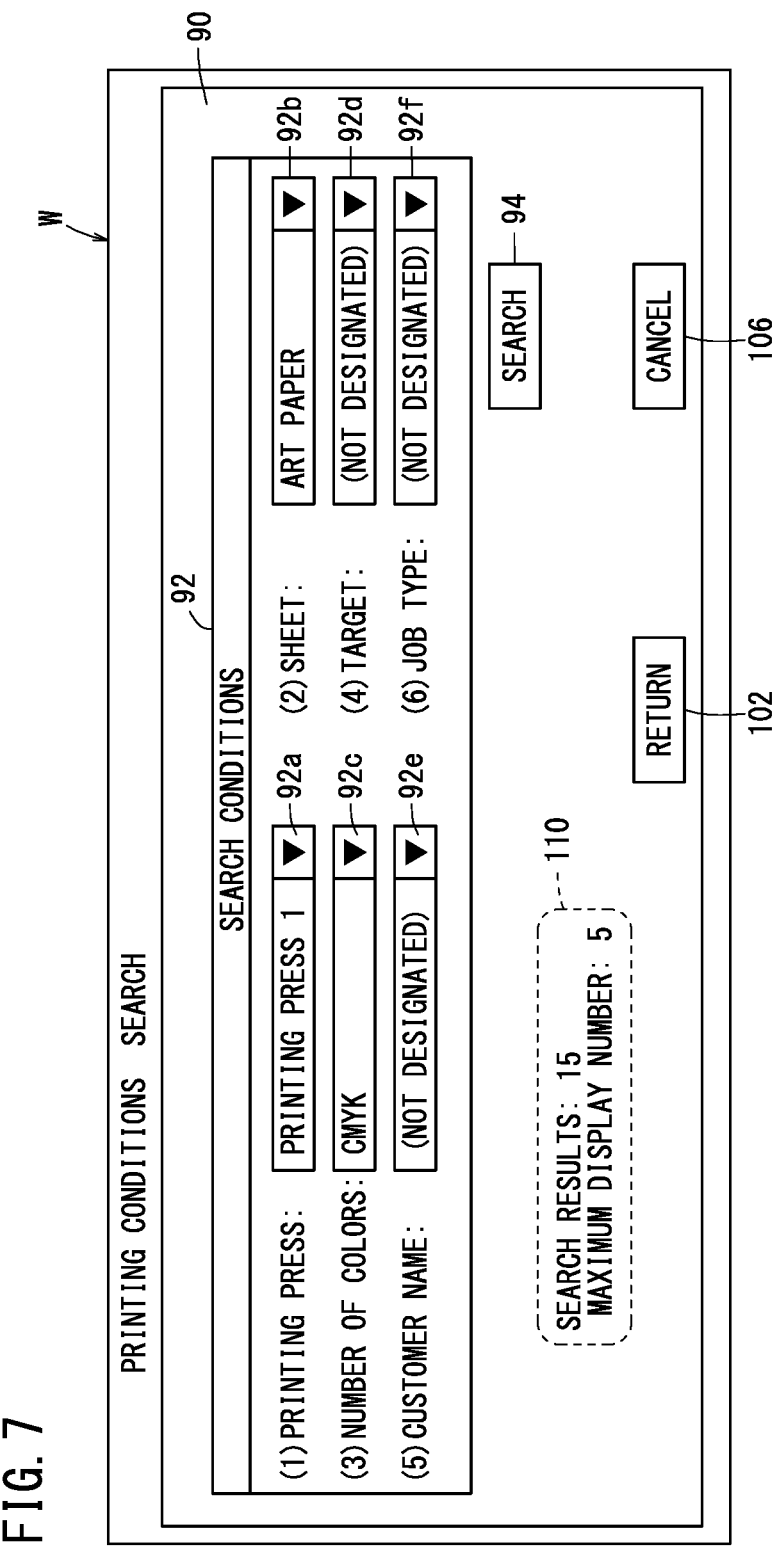
FIG. 7 is a view of a second image showing an example of a search screen.

Operations of the RIP apparatus 20 in the event that printing conditions are not sufficiently narrowed down in the search process will be described below. As shown in FIG. 7, it is assumed that the items input in combo boxes 92a through 92c are the same as those shown in FIG. 6. "NOT DESIGNATED" is selected and input for the target (combo box 92d), the customer name (combo box 92e), and the job type (combo box 92f). In this case, if "NOT DESIGNATED" is input for a target of the fourth priority, "NOT DESIGNATED" is automatically input for condition items having lower priorities (the customer name and the job type). In step S3, the server apparatus 16 searches for printing conditions, and discovers 15 printing condition groups in excess of the maximum display number (5) designated through the setting screen 80 (see FIG. 5).

Then, instead of the search result list image 100 displayed in the search screen 90 shown in FIG. 9, as shown in FIG. 7, the search screen 90 includes a message image 110 in the lower half portion thereof. The message image 110 represents the number (15) of printing condition groups found in the present search process as well as the maximum display number (5). Thus, the message image 110 effectively prompts the operator to change the search conditions in order to narrow down the number of discovered printing condition groups, and to carry out a search process based on the new search conditions.

In step S6 shown in FIG. 3, the controller 36 judges whether or not there is an instruction from the operator to determine a printing condition group from among a plurality of group candidates. More specifically, the controller 36 judges whether or not the operator has clicked on the "OK" button 104 while a group of group candidates has been selected in the search screen 90 shown in FIG. 6. In FIG. 6, as a result of the operator clicking thereon, a portion of the search result list image 100 is highlighted, i.e., is shown in hatching, thereby indicating that "GROUP C" is currently selected from among the three group candidates. If the operator clicks on the "CANCEL" button 106, the RIP apparatus 20 terminates the search process.

If the controller 36 determines that no instruction from the operator exists in step S6, then control returns to step S2 or step S5, thereby repeating steps S2 through S5 or step S5. On the other hand, if the controller 36 determines that there is an instruction from the operator in step S6, control proceeds to step S7.

In step S7, the list image generator 68 generates an environmental conditions list image 126 (see FIG. 8). The environmental conditions list image 126 comprises an image representing a line-up of visible information concerning temperature and humidity environments depending on environmental condition items, which are included in the printing conditions that belong to printing condition groups having at least one non-environmental condition item (six non-environmental condition items in FIG. 6) in common. Two or more printing conditions, which finally can be determined from a selected group of printing condition groups, will hereinafter be referred to as "printing condition candidates".

Prior to generating an image, the environmental information acquirer 54 acquires environmental information for enabling a printing job to be carried out. If the RIP apparatus 20 and the offset press 32 are capable of communicating with each other, then the environmental information acquirer 54 may acquire temperature and humidity data read by a temperature and humidity sensor, not shown, which is included in or positioned near the offset press 32. The environmental information acquirer 54 may also acquire the date and time at which the printing job is carried out, as well as an installation location, etc., by referring to the job ticket depending on the printing job. Furthermore, the environmental information acquirer 54 may acquire environmental information through a setting screen, not shown, which is displayed on the display unit 42 for enabling the operator to manually enter environmental information.

Thereafter, the condition analyzer 66 analyzes the content of the environmental condition items included in the printing condition candidates belonging to the printing condition group determined in step S6. In this manner, temperatures, humidities, periods of use, and dot gain curve types, which are associated with the respective printing condition candidates, are acquired.

Thereafter, the list image generator 68 generates the environmental conditions list image 126 made up of contents of the environmental condition items acquired from the condition analyzer 66. Visible information concerning temperature and humidity environments may be presented in any form that allows the operator to visually perceive different pieces of information, e.g., characters, numerals, figures, symbols, or graphs.

In step S8 shown in FIG. 3, the RIP apparatus 20 displays a list of environmental conditions. More specifically, the screen generator 64 generates display data for a search screen 120 (see FIG. 8), which includes the environmental conditions list image 126, and supplies the generated display data to the display controller 40. Based on the supplied display data, the display controller 40 displays a window W including the search screen 120 on the display unit 42.

As shown in FIG. 8, the search screen 120 includes, successively from above, a display field 122 indicating a portion of the condition items concerning a printing condition group, a display field 124 indicating present environmental information, the environmental conditions list image 126 of the printing condition candidates, a button 128 labeled "RETURN", a button 130 labeled "OK", and a button 132 labeled "CANCEL". The "OK" button 130 performs the function of the decision instructor 72 for instructing the controller 36 to determine a printing condition from among a plurality (three in FIG. 8) of printing condition candidates belonging to a printing condition group.

The display field 124 displays temperature, humidity, and the present date. The environmental conditions list image 126 includes a small field 126*a* indicating the names of dot gain curves, a small field 126*b* indicating recommended temperature ranges, a small field 126*c* indicating recommended humidity ranges, a small field 126*d* indicating periods of use, and a small field 126*e* indicating installation countries/locations.

While referring to the content of the display field 124, the operator selects one printing condition, which is equal or close to the present temperature and humidity environment, from among the printing conditions displayed in the environmental conditions list image 126. Alternatively, the condition selector 62 may compare and evaluate temperature and humidity environments depending on the printing condition candidates, and the temperature and humidity environment acquired from the environmental information acquirer 54, whereupon the condition selector can select one printing condition candidate, which is evaluated as being closest to the present temperature and humidity environment. The RIP apparatus 20 may display on the display unit 42 the printing condition candidate selected by the condition selector 62 as a recommended condition.

In step S9 shown in FIG. 3, the controller 36 judges whether or not there is an instruction from the operator to determine or settle on a printing condition from among a plurality of printing condition candidates. More specifically, the controller 36 judges whether or not the operator has clicked on the "OK" button 130 while a group of group candidates has been selected on the search screen 120 shown in FIG. 8. In FIG. 8, a portion of the environmental conditions list image 126 of is highlighted, i.e., is shown in hatching, by the operator clicking thereon, thereby indicating that "STANDARD CURVE" is currently selected from among the three printing condition candidates. If the operator clicks on the "CANCEL" button 132, the RIP apparatus 20 terminates the search process.

If the controller 36 determines that the operator has not made an instruction in step S9, then control returns to step S2 or step S5, and steps S2 through S8 or steps S5 through S8 are repeated. If the controller 36 decides that there is an instruction from the operator in step S9, then control proceeds to step S10.

In step S10, the printing condition determiner 50 determines one printing condition that is suitable for the printing job to be carried out. Based on the determined printing conditions, the rasterizing processor 56 performs a rasterizing process on proof data or proofread data. Then, the print production system 10 performs a proofreading process or a printing process.

As described above, since the controller 36 includes the condition selector 62 for selecting, from among a plurality of printing conditions, a group of printing conditions having at least one condition item in common except for environmental condition items concerning temperature and humidity environments for printing, difficulty of the search process using the environmental condition items is eliminated. The controller 36 also includes the list image generator 68 for generating the environmental conditions list image 126, which represents a line-up of visible information concerning temperature and humidity environments depending on the environmental condition items. Therefore, by comparing the visible information represented by the environmental conditions list image 126, the operator can immediately grasp the adequacy of temperature and humidity environments depending on the environmental condition items. As a consequence, an appropriate printing condition can be determined highly accurately and without fail from among a plurality of printing conditions, including condition items concerning temperature and humidity environments.

A modification of the above embodiment will be described below with reference to FIGS. 9A and 9B. The modification differs from the above-described embodiment in that a process is provided for assigning priorities concerning condition items.

Figure 9A:
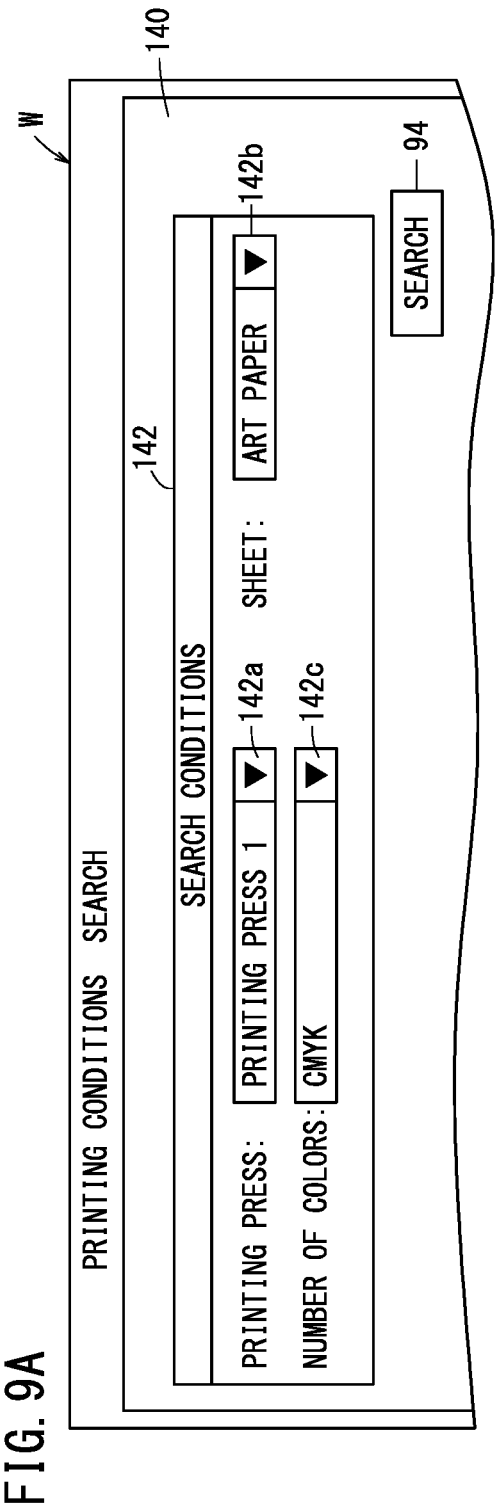
FIGS. 9A and 9B are views of partial images showing an example of a search image according to a modification.
Figure 9B:
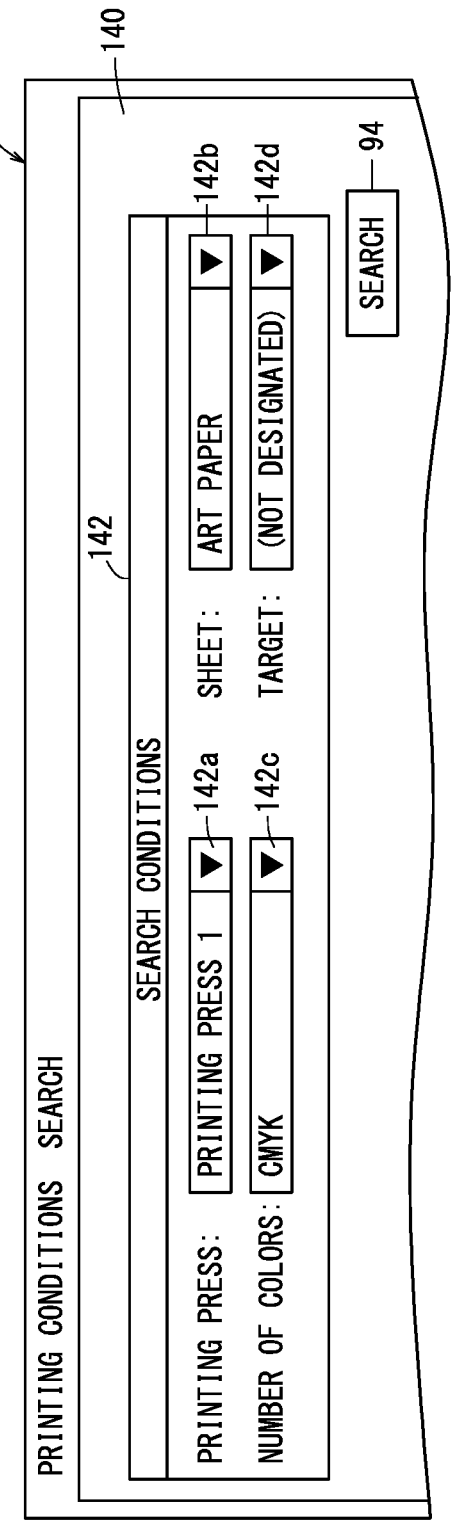

FIGS. 9A and 9B show images representing, by way of example, a search screen 140 according to the aforementioned modification. The search screen 140 basically has the same configuration as the search screen 90 shown in FIGS. 6 and 7, except that an input field 142 is provided, which is different from the input field 92 shown in FIGS. 6 and 7. For illustrative purposes, a portion of the search screen 140 is omitted from illustration in FIGS. 9A and 9B.

As shown in FIG. 9A, the input field 142 includes three combo boxes 142*a* through 142*c*. It is assumed that, in response to actions made by the operator on the input unit 44, "PRINTING PRESS 1" is designated as the printing press (the printing press name in FIG. 4), "ART PAPER" is selected as the sheet (the sheet type in FIG. 4), and "CMYK" is selected as the number of colors (the color plates in FIG. 4) in the search screen 90. It also is assumed, in the case that the server apparatus 16 searches for printing conditions in step S3, the server apparatus 16 discovers 15 printing condition groups in excess of the maximum display number (5) designated through the setting screen 80 (see FIG. 5).

Then, as shown in FIG. 9B, the search screen 140 displays another combo box 142d, not shown in FIG. 9A, in addition to the message image 110 (see FIG. 7). Therefore, if it is judged that a certain search condition is not satisfied, e.g., if it is judged that the number of discovered printing condition groups is greater than the maximum display number, the search information input unit 70 may successively add search conditions that can be entered, i.e., new condition items, according to a priority sequence that has been designated in advance. In this manner, the search process can be carried out in an orderly sequence for assisting the operator in making actions on the input unit 44.

Although a certain preferred embodiment of the present invention has been shown and described in detail, it should be understood that various changes and modifications may be made to the embodiments without departing from the scope of the present invention as set forth in the appended claims.

What is claimed is:

1. A printing condition determining apparatus comprising:
    a condition selector for selecting a group of printing conditions, which have at least one condition item in common except for environmental condition items concerning a temperature and humidity environment for printing, from among a plurality of printing conditions each representing a combination of two or more condition items concerning printing; and
    a list image generator for generating a list image, which represents a line-up of visible information concerning the temperature and humidity environment depending on the environmental condition items, and which is included in the printing conditions of the group selected by the condition selector.

2. The printing condition determining apparatus according to claim 1, further comprising:
    a search information input unit for inputting search information to carry out a search process on the plurality of printing conditions.

3. The printing condition determining apparatus according to claim 2, wherein the condition selector selects the group of printing conditions from among a predetermined number of printing condition groups, which are obtained by the search process according to the search information input by the search information input unit.

4. The printing condition determining apparatus according to claim 2, wherein the search information input unit inputs as the search information priorities concerning at least two condition items used in the search process.

5. The printing condition determining apparatus according to claim 1, further comprising:
    an environmental information acquirer for acquiring information concerning the temperature and humidity environment,
    wherein the condition selector further selects a printing condition, which is equal or close to the temperature and humidity environment acquired by the environmental information acquirer, from among the group of printing conditions.

6. The printing condition determining apparatus according to claim 1, wherein the environmental condition items include at least a dot gain curve.

7. The printing condition determining apparatus according to claim 1, further comprising:
    a display unit for displaying the list image generated by the list image generator.

8. A printing condition determining method for enabling an apparatus to determine a printing condition representing a combination of two or more condition items concerning printing, and to carry out the steps of:
    selecting a group of printing conditions, which have at least one condition item in common except for environmental condition items concerning a temperature and humidity environment for printing, from among a plurality of printing conditions; and
    generating a list image, which represents a line-up of visible information concerning the temperature and humidity environment depending on the environmental condition items, and which is included in the printing conditions of the selected group.

9. A non-transitory storage medium, which is readable by a computer and stores therein a program for determining a printing condition representing a combination of two or more condition items concerning printing, the program enabling the computer to carry out the steps of:
    selecting a group of printing conditions, which have at least one condition item in common except for environmental condition items concerning a temperature and humidity environment for printing, from among a plurality of printing conditions; and
    generating a list image, which represents a line-up of visible information concerning the temperature and humidity environment depending on the environmental condition items, and which is included in the printing conditions of the selected group.

* * * * *